(12) United States Patent
Wang

(10) Patent No.: US 8,245,411 B2
(45) Date of Patent: Aug. 21, 2012

(54) SURFACE GEOMETRY CHARACTERS MEASURING GAUGE

(75) Inventor: Zih-Wei Wang, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 396 days.

(21) Appl. No.: 12/648,042

(22) Filed: Dec. 28, 2009

(65) Prior Publication Data

US 2010/0251559 A1    Oct. 7, 2010

(30) Foreign Application Priority Data

Apr. 1, 2009    (CN) .......................... 2009 1 0301253

(51) Int. Cl.
*G01B 3/14* (2006.01)

(52) U.S. Cl. .......................................... 33/551; 33/552

(58) Field of Classification Search ............ 33/549–553, 33/555, 542, 542.1, 543, 555.1, 555.2, 568, 33/573, 501.1–501.45, 501.6
See application file for complete search history.

(56) References Cited

U.S. PATENT DOCUMENTS

| | | | | |
|---|---|---|---|---|
| 1,637,482 A | * | 8/1927 | Graves .......................... | 33/501.2 |
| 3,073,033 A | * | 1/1963 | Dega ............................... | 33/543 |
| 3,913,234 A | * | 10/1975 | Windle ............................ | 33/803 |
| 3,942,253 A | * | 3/1976 | Gebel et al. ..................... | 33/555.1 |
| 4,122,609 A | * | 10/1978 | Flair ................................. | 33/553 |
| 4,128,943 A | * | 12/1978 | Muhlethaler .................... | 33/542 |
| 4,209,206 A | * | 6/1980 | McMurtry et al. ............. | 384/114 |
| 6,427,353 B1 | * | 8/2002 | Nelson et al. ................... | 33/552 |
| 6,954,991 B2 | * | 10/2005 | Akatsuka et al. ............... | 33/550 |
| 7,461,462 B2 | * | 12/2008 | Bankestrom et al. ........... | 33/550 |
| 7,748,134 B1 | * | 7/2010 | Wang ............................... | 33/551 |
| 8,020,309 B2 | * | 9/2011 | Nakayama et al. ............. | 33/550 |

* cited by examiner

*Primary Examiner* — G. Bradley Bennett
*Assistant Examiner* — Tania Courson
(74) *Attorney, Agent, or Firm* — Altis Law Group, Inc.

(57) ABSTRACT

An exemplary surface geometry characters measuring gauge includes a chassis, a spindle, a locating assembly, and a micrometer. The spindle is rotatably mounted on a surface of the chassis. The locating assembly is mounted on the spindle and structured and arranged for fastening a workpiece on the spindle. The micrometer is attached on the chassis corresponding to and spaced from the spindle. The micrometer is configured for contacting a surface of the workpiece and measuring one or more surface geometry characters of the workpiece.

14 Claims, 3 Drawing Sheets

SURFACE GEOMETRY CHARACTERS MEASURING GAUGE

BACKGROUND

1. Technical Field

The disclosure relates to a surface geometry characters measuring gauge for measuring the radial deviation and/or other surface geometry characters of objects having nominally circular cross sections.

2. Description of Related Art

In manufacturing, roundness measurement for a workpiece with a circular cross section is typically carried out by a large sized precision measuring instrument. The precision measuring instrument is expensive, and it is costly for a large factory to be equipped with a number of such precision measuring instruments.

Therefore, what is needed is to provide a surface geometry characters measuring gauge with a simple structure and low cost.

DETAILED DESCRIPTION

Figure 1:
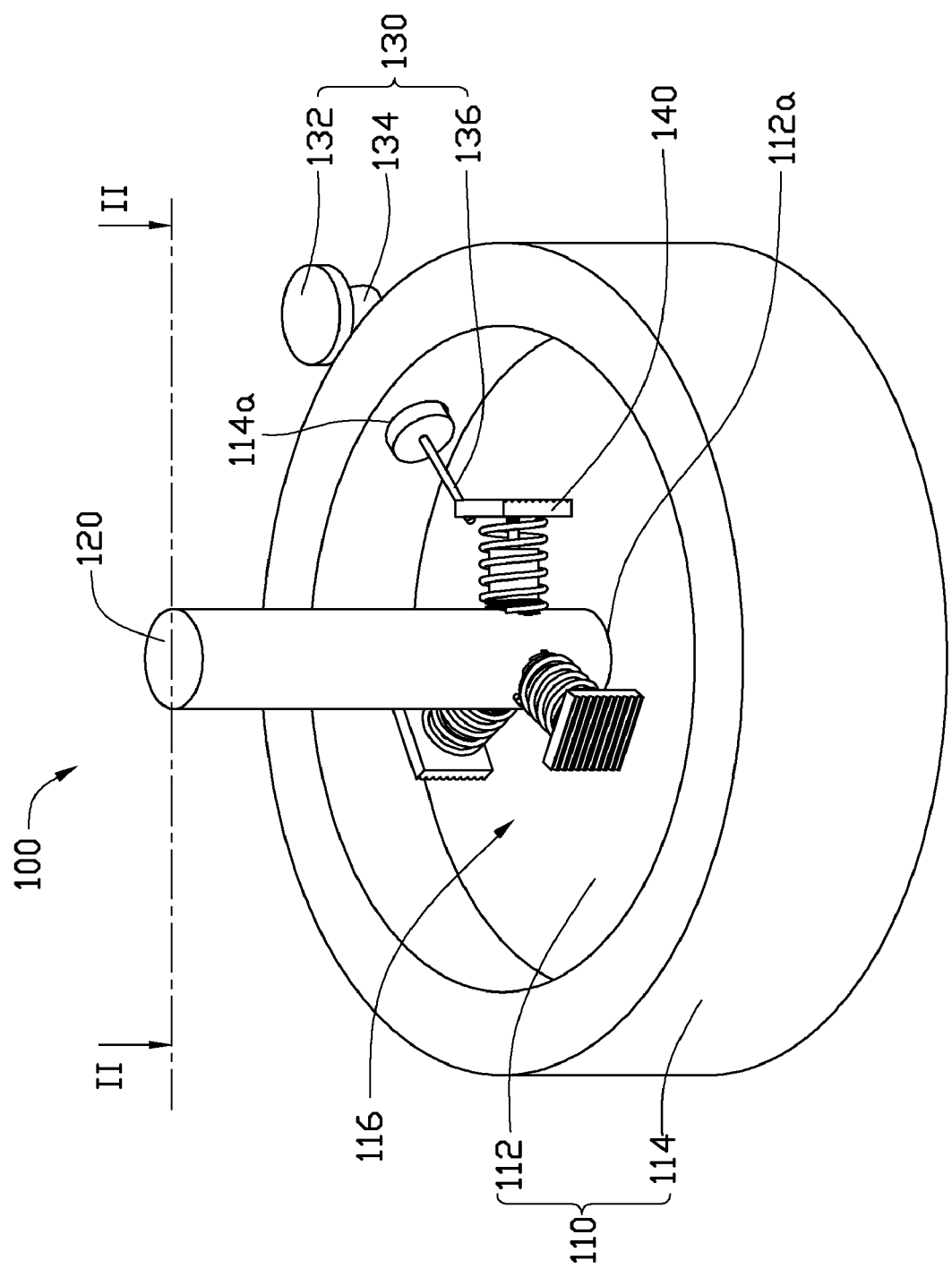
FIG. 1 is an isometric view of a surface geometry characters measuring gauge according to an exemplary embodiment.

Referring to FIG. 1, a surface geometry characters measuring gauge 100 according to an exemplary embodiment is shown. The surface geometry characters measuring gauge 100 includes a chassis 110, a spindle 120, a micrometer 130, and a locating assembly 140. The spindle 120 is rotatably mounted on the chassis 110. The micrometer 130 is attached on the chassis 110 and spaced away from the spindle 120. The locating assembly 140 is mounted on the spindle 120 for fastening a workpiece 200 (see FIG. 3) on the spindle 120.

The chassis 110 is generally disk-shaped (or cylindrical), and includes a base 112 and an annular side wall 114 perpendicularly extending upward from a periphery of the base 112. The base 112 and the side wall 114 cooperatively form a generally disk-shaped (or cylinder-shaped) housing space 116. A shaft hole 112a is defined in a center of the base 112 for rotatably receiving an end of the spindle 120. The side wall 114 includes a through hole 114a spanning from its outer surface (not labeled) to its inner surface (not labeled). Exemplarily, an axis of the through hole 114a is perpendicular to an axis of the spindle 120.

The spindle 120 is cylinder-shaped and rotatably installed in the shaft hole 112a. A top end of the spindle 120 can be rotated manually, in order to drive the workpiece 200 mounted on the spindle 120 to rotate. To smooth the rotation of the spindle 120, a bearing (not shown) can be fixed in the shaft hole 112a and yoked on a bottom end of the spindle 120.

The micrometer 130 is mounted on the side wall 114. The micrometer 130 includes an indicator 132, a leg 134 and a probe 136. The indicator 132 is used for deriving a value on a scale of measurement from a series of measurements of an outer surface of the workpiece 200. The leg 134 is a hollow cylinder connected to the indicator 132, and is inserted into the through hole 114a whereby the micrometer 130 is mounted on the side wall 114. The probe 136 has a base end connected to inner mechanical structures of the indicator 132, and an opposite probing end protruded from the leg 134 to contact the outer surface of the workpiece 200.

Figure 2:
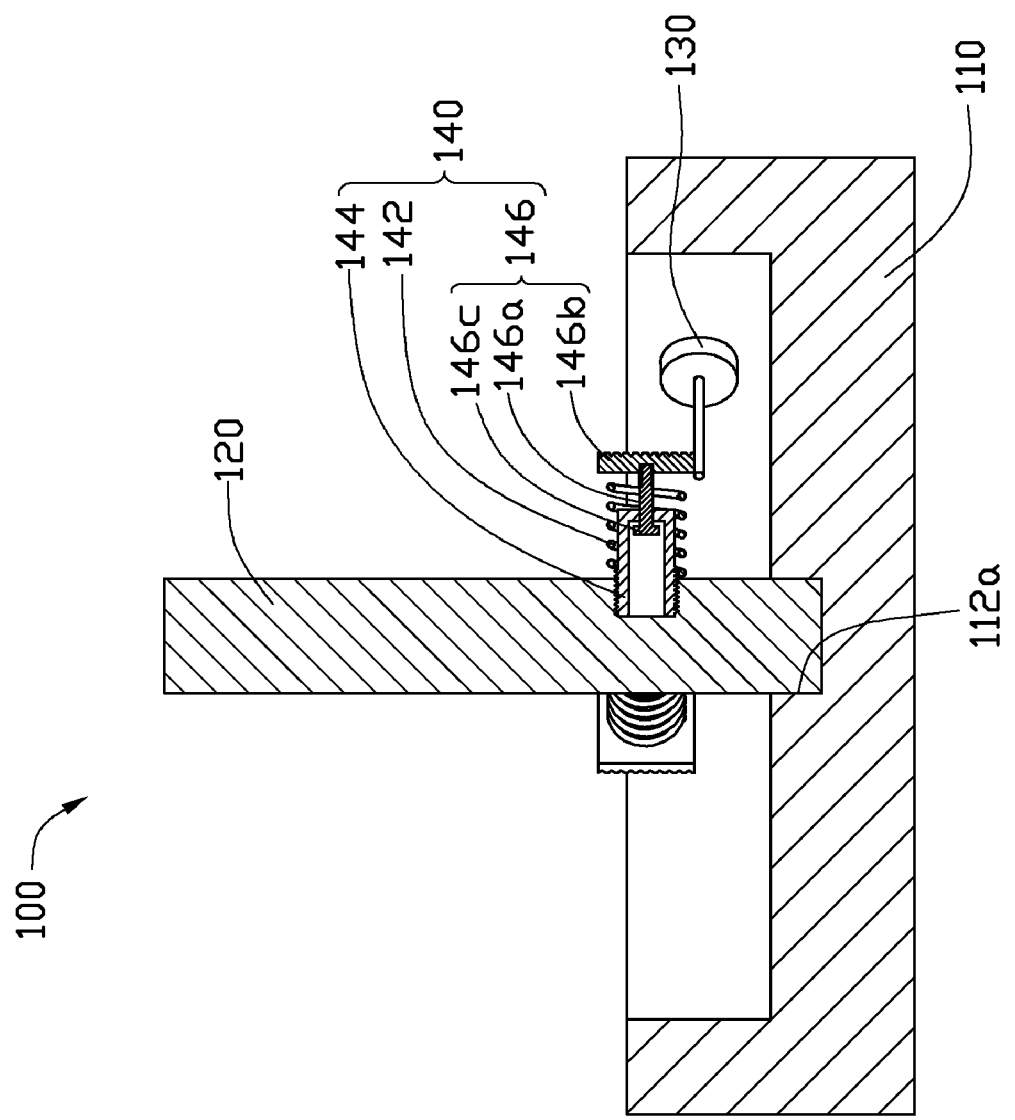
FIG. 2 is a cross sectional view of the surface geometry characters measuring gauge of FIG. 1, taken along a line II-II thereof.

The locating assembly 140 is for holding the workpiece 200. The locating assembly 140 is mounted on the spindle 120, a short distance above the base 112 of the chassis 110. Referring also to FIG. 2, the locating assembly 140 includes a number of springs 142, a corresponding number of fastening posts 144, and a corresponding number of locating blocks 146. The fastening posts 144 are substantially hollow cylinders. One end of each fastening post 144 has a male thread, by which the fastening post 144 is threadedly engaged in a corresponding female threaded hole defined in the spindle 120. The fastening posts 144 are equally angularly spaced apart from each other around the spindle 120. Each of the locating blocks 146 is movably mounted on a corresponding fastening post 144. Each of the locating blocks 146 includes a rod 146a slidably received in the corresponding fastening post 144, a holding pad 146b perpendicularly mounted on an end of the rod 146a that is exposed outside of the fastening post 144, and a limiting member 146c formed on an opposite end of the rod 146a that is inside the fastening post 144. A diameter of the limiting member 146c is larger than that of the rod 146a, for preventing the locating block 146 from being disengaged from the fastening post 144. The springs 142 are respectively coiled on the corresponding fastening posts 144, and are compressed between the corresponding holding pads 146b and the spindle 120.

Figure 3:
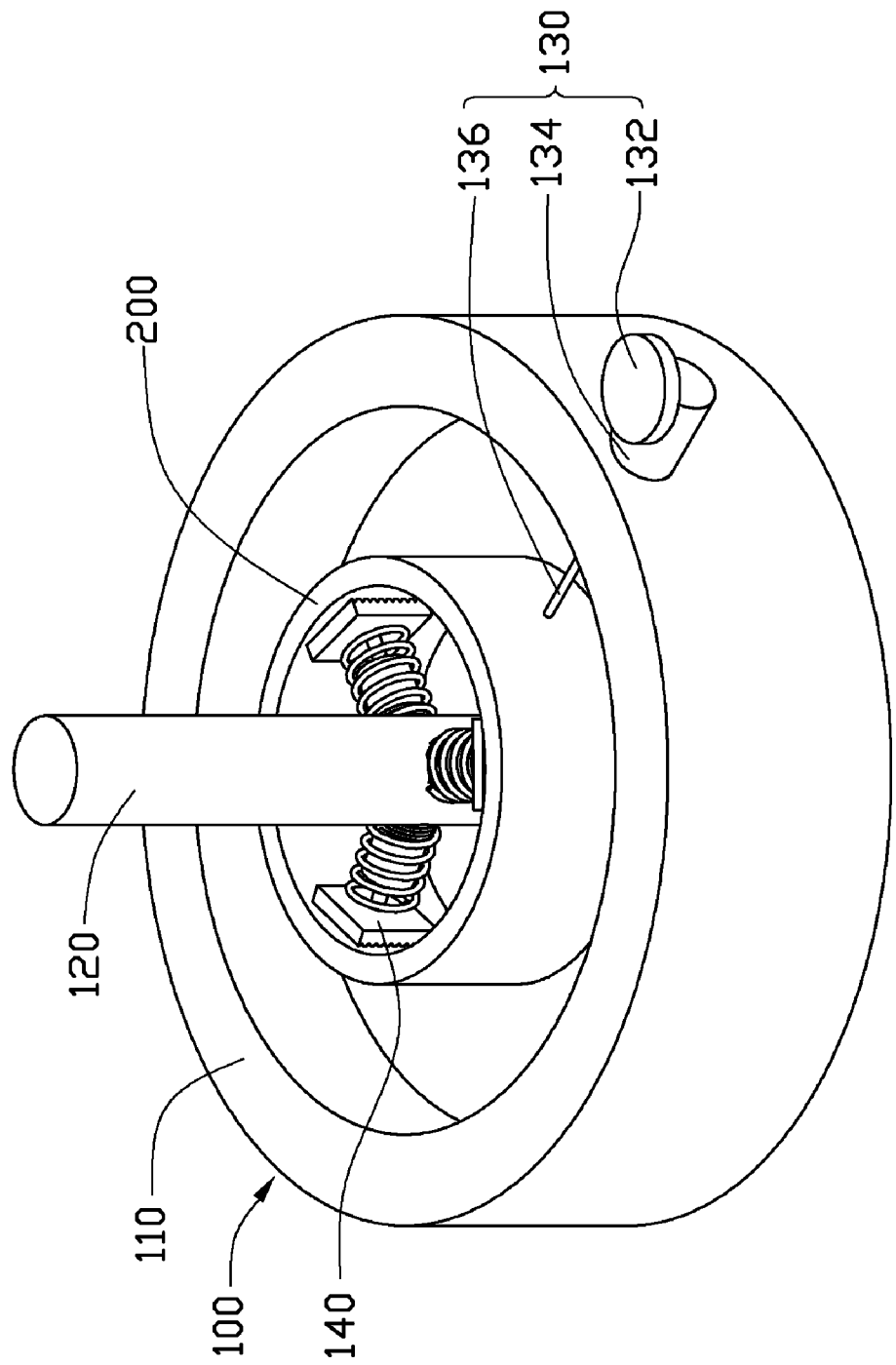
FIG. 3 is an isometric view of the surface geometry characters measuring gauge of FIG. 1 in use measuring a workpiece.

Referring also to FIG. 3, in use of the surface geometry characters measuring gauge 100, the workpiece 200 to be measured is housed in the housing space 116, and is elastically held in position by the locating assembly 140. The locating blocks 146 can extend out and retract relative to the corresponding fastening posts 144, and thus relative to the spindle 120 too. Thereby, the locating blocks 146 in cooperation with the springs 142 provide the locating assembly 140 with the capability of self-centering the workpiece 200. When the workpiece 200 is loaded on the locating assembly 140, the locating assembly 140 can automatically center the workpiece 200 to make a center axis of the workpiece 200 coaxial with the axis of the spindle 120. The holding pads 146b tightly resist an inner surface of the workpiece 200. After the workpiece 200 has been precisely located on the spindle 120 in this way, the probe 136 is adjusted to contact an outer surface of the workpiece 200. Subsequently, the spindle 120 is rotated manually to drive the workpiece 200 to rotate. Thus, a characteristic of the workpiece 200, such as a roundness, a roughness, or an eccentricity of the outer surface of the workpiece 200, is derived from the micrometer 130 following the rotation of the workpiece 200.

Furthermore, an outer surface of each holding pad 146b can be roughened to enhance the friction between the holding pad 146b and the workpiece 200. Thereby, the workpiece 200 can be stably and tightly held on the locating assembly 140. In addition, the leg 134 of the micrometer 130 can be fastened on the side wall 114 of the chassis 110 by a bolt (not shown) for preventing the micrometer 130 from being offset during the measurement of the workpiece 200.

It is believed that the present embodiments and their advantages will be understood from the foregoing description, and it will be apparent that various changes may be made thereto without departing from the spirit and scope of the disclosure or sacrificing all of its material advantages, the examples hereinbefore described merely being preferred or exemplary embodiments of the disclosure.

What is claimed is:

1. A surface geometry characters measuring gauge comprising:
- a chassis, the chassis being generally cylinder-shaped and comprising a base and a side wall perpendicularly extending from a periphery of the base, the base and the side wall cooperatively forming a generally cylinder-shaped housing space;
- a spindle rotatably mounted on the chassis;
- a locating assembly mounted on the spindle and structured and arranged for fastening a workpiece on the spindle, the locating assembly comprising a plurality of springs, a corresponding plurality of fastening posts, and a corresponding plurality of locating blocks, the fastening posts being evenly angularly spaced apart from each other around the spindle, the locating blocks being movably mounted on the corresponding fastening posts, the springs being respectively positioned around the corresponding fastening posts and compressed between the corresponding locating blocks and the spindle; and
- a micrometer attached on the chassis and spaced from the spindle, the micrometer configured for contacting a surface of the workpiece and measuring one or more surface geometry characters of the workpiece.

2. The surface geometry characters measuring gauge of claim 1, wherein the side wall comprises a through hole; and the micrometer is attached in the through hole.

3. The surface geometry characters measuring gauge of claim 2, wherein the micrometer comprises an indicator, a leg fixedly connected to the indicator and engaged in the through hole of the side wall, and a probe, and the probe is connected to inner mechanical structures of the indicator and protrudes from the leg in order to contact the surface of the workpiece.

4. The surface geometry characters measuring gauge of claim 1, wherein the base defines a shaft hole in a center thereof; and an end of the spindle is rotatably received in the shaft hole.

5. The surface geometry characters measuring gauge of claim 1, wherein each of the locating blocks comprises a rod slidably received in the corresponding fastening post, a holding pad perpendicularly mounted on an end of the rod exposed outside of the fastening post, and a limiting member formed on an opposite end of the rod inside the fastening post.

6. The surface geometry characters measuring gauge of claim 5, wherein a diameter of the limiting member is greater than a diameter of the rod, thereby preventing the locating block from being disengaged from the fastening post.

7. The surface geometry characters measuring gauge of claim 6, wherein an outer surface of each holding pad is roughened.

8. A surface geometry characters measuring gauge comprising:
- a chassis, the chassis being generally disk-shaped and comprising a base, a side wall perpendicularly extending from a periphery of the base, the base and the side wall cooperatively forming a generally cylinder-shaped housing space;
- a self-centering mechanism provided in the chassis for fastening and self-centering a workpiece thereon, the self-centering mechanism comprising a spindle rotatably mounted on the chassis and a locating assembly mounted on the spindle and structured and arranged for fastening the workpiece on the spindle, the locating assembly comprising a plurality of springs, a corresponding plurality of fastening posts, and a corresponding plurality of locating blocks, the fastening posts being evenly angularly spaced apart from each other around the spindle and short distance above the base of the chassis, the locating blocks being movably mounted on the corresponding fastening posts, the springs being respectively positioned around the corresponding fastening posts and compressed between the corresponding locating blocks and the spindle; and
- a micrometer attached on the chassis and spaced from the self-centering mechanism, the micrometer configured for contacting a surface of the workpiece and measuring at least one surface geometry character of the workpiece.

9. The surface geometry characters measuring gauge of claim 8, wherein the side wall comprises a through hole; and the micrometer is attached in the through hole.

10. The surface geometry characters measuring gauge of claim 8, wherein the base defines a shaft hole in a center thereof; and an end of the spindle is rotatably received in the shaft hole.

11. The surface geometry characters measuring gauge of claim 10, wherein the micrometer comprises an indicator, a leg fixedly connected to the indicator and engaged in the through hole of the side wall, and a probe, and the probe is connected to inner mechanical structures of the indicator and protrudes from the leg in order to contact the surface of the workpiece.

12. The surface geometry characters measuring gauge of claim 8, wherein each of the locating block comprises a rod slidably received in the corresponding fastening post, a holding pad perpendicularly mounted on an end of the rod exposed outside of the fastening post, and a limiting member formed on an the opposite end of the rod inside the fastening post.

13. The surface geometry characters measuring gauge of claim 12, wherein a diameter of the limiting member is greater than a diameter of the rod thereby preventing the locating block from being disengaged from the fastening post.

14. The surface geometry characters measuring gauge of claim 13, wherein an outer surface of each holding pad is roughened.

* * * * *